US010855876B2

(12) United States Patent
Saito

(10) Patent No.: US 10,855,876 B2
(45) Date of Patent: Dec. 1, 2020

(54) MANAGEMENT SYSTEM CONFIGURED TO MANAGE AND STORE IMAGE DATA GENERATED BY AN IMAGE PROCESSING DEVICE AND TRANSMIT REQUESTED IMAGE DATA TO A TERMINAL DEVICE AND COMMUNICATION SYSTEM HAVING THE SAME

(71) Applicant: BROTHER KOGYO KABUSHIKI KAISHA, Aichi (JP)

(72) Inventor: Ken Saito, Tokoname (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 309 days.

(21) Appl. No.: 15/275,845

(22) Filed: Sep. 26, 2016

(65) Prior Publication Data

US 2017/0094101 A1   Mar. 30, 2017

(30) Foreign Application Priority Data

Sep. 30, 2015   (JP) .................................. 2015-194160

(51) Int. Cl.
*H04N 1/32*   (2006.01)
*H04N 1/00*   (2006.01)
*H04N 1/21*   (2006.01)

(52) U.S. Cl.
CPC ..... *H04N 1/32122* (2013.01); *H04N 1/00106* (2013.01); *H04N 1/00307* (2013.01);
(Continued)

(58) Field of Classification Search
None
See application file for complete search history.

(56) References Cited

U.S. PATENT DOCUMENTS

| 2009/0231635 | A1* | 9/2009 | Okada ................ H04N 1/32512 358/474 |
| 2012/0132701 | A1* | 5/2012 | Nakagawa ............. G06Q 30/02 235/375 |

(Continued)

FOREIGN PATENT DOCUMENTS

| JP | 2008-236159 A | 10/2008 |
| JP | 2010-114840 A | 5/2010 |

(Continued)

OTHER PUBLICATIONS

Official Action dated Jul. 2, 2019 received from the Japanese Patent Office in related application JP 2015-194160 together with an English language translation.

*Primary Examiner* — Mohammad H Ghayour
*Assistant Examiner* — Pawan Dhingra
(74) *Attorney, Agent, or Firm* — Scully Scott Murphy and Presser

(57) ABSTRACT

In response to a position information request, a controller in a management system transmits original image position information to an image processing device such that the controller transmits first and second original image position information, respectively, in response to first and second position information requests that are different from each other, first and second original image storage positions indicated by the first and second original image position information being different from each other. The controller receives original image data from the image processing device that has accessed by using the original image position information, stores the original image data at an original image storage position, and transmits code data to the image processing device. In response to a target image data request from a terminal device that has acquired target image (Continued)

position information by reading a code image, the controller transmits target image data to the terminal device.

23 Claims, 7 Drawing Sheets

(52) U.S. Cl.
CPC ....... *H04N 1/00344* (2013.01); *H04N 1/2166* (2013.01); *H04N 2201/0094* (2013.01)

(56) References Cited

U.S. PATENT DOCUMENTS

| | | | |
|---|---|---|---|
| 2013/0051692 A1* | 2/2013 | Kakutani | H04N 1/32133 |
| | | | 382/233 |
| 2014/0115711 A1* | 4/2014 | Stevenson | H04W 4/60 |
| | | | 726/26 |
| 2014/0280772 A1 | 9/2014 | Miyata | |
| 2015/0154157 A1* | 6/2015 | Itogawa | G06F 16/9554 |
| | | | 715/205 |
| 2017/0099646 A1* | 4/2017 | Ido | H04W 60/04 |

FOREIGN PATENT DOCUMENTS

| | | |
|---|---|---|
| JP | 2010-170234 A | 8/2010 |
| JP | 2013-058835 A | 3/2013 |
| JP | 2014-174887 A | 9/2014 |

\* cited by examiner

FIG. 8

UPLOAD DESTINATION LOCATION (URL2)

https://xxx/yyy/?uid=002

DOWNLOAD SOURCE LOCATION (URL3)

https://xxx/yyy/?uid=003

MANAGEMENT SYSTEM CONFIGURED TO MANAGE AND STORE IMAGE DATA GENERATED BY AN IMAGE PROCESSING DEVICE AND TRANSMIT REQUESTED IMAGE DATA TO A TERMINAL DEVICE AND COMMUNICATION SYSTEM HAVING THE SAME

CROSS REFERENCE TO RELATED APPLICATION

This application claims priority from Japanese Patent Application No. 2015-194160 filed Sep. 30, 2015. The entire content of the priority application is incorporated herein by reference.

TECHNICAL FIELD

The present disclosure relates to a management system, a communication system, and a computer program that allow a terminal device to acquire image data from an image processing device.

BACKGROUND

Japanese Patent Application Publication No. 2008-236159 discloses a technology in which photographing a QR code displayed on a display panel of a camera using a mobile phone allows the mobile phone to acquire image data photographed by the camera. The camera stores the photographed image data in a storage position in a storage area of a site server in which the image data should be stored. Further, the camera generates a QR code concerning the storage position and displays the generated QR code on the display panel thereof. The mobile phone photographs the QR code displayed on the display panel of the camera and thereby acquires the image data stored in the storage position.

SUMMARY

In the technology disclosed in the above-mentioned Japanese patent document, the camera previously acquires, from the site server, information required for determining the storage position in the storage area in which the image data should be stored. The camera determines the storage position by using both of: the information acquired from the site server so as to identify the storage area; and information concerning the storage position which is determined by the camera. The camera then stores the image data in the determined storage position. However, another method for storing the image data in a management system is required.

In view of the above-described situation, an object of the present disclosure is to provide a technology for storing image data in a management system according to a method that is different from the conventional one, in order to transmit, to a terminal device, target image data that is obtained based on original image data.

According to one aspect, a management system is capable of communicating with both of an image processing device and a terminal device. The management system includes: a network interface; and a controller configured to perform:

receiving a position information request through the network interface from the image processing device, the position information request being for requesting transmission of original image position information indicative of an original image storage position in an image data storage at which original image data is to be stored;

in response to receiving the position information request, transmitting the original image position information through the network interface to the image processing device such that the controller transmits first original image position information in response to receiving a first position information request and transmits second original image position information in response to receiving a second position information request, the first position information request and the second position information request being different from each other, a first original image storage position indicated by the first original image position information and a second original image storage position indicated by the second original image position information being different from each other;

receiving the original image data through the network interface from the image processing device that has accessed the management system by using the original image position information;

storing the original image data at the original image storage position in the image data storage;

transmitting code data through the network interface to the image processing device, the code data being for acquiring target image position information indicative of a target image storage position in the image data storage at which target image data is stored based on the original image data, the code data expressing a code image to be displayed on the image processing device;

receiving a target image data request through the network interface from the terminal device that has acquired the target image position information by reading the code image displayed on the image processing device, the target image data request designating the target image storage position indicated by the target image position information and requesting transmission of the target image data; and in response to receiving the target image data request, transmitting the target image data through the network interface to the terminal device.

According to another aspect, a communication system includes: an image processing device; and a management system capable of communicating with the image processing device and a terminal device. The management system includes: a network interface; and a controller configured to perform:

receiving a position information request through the network interface from the image processing device, the position information request being for requesting transmission of original image position information indicative of an original image storage position in an image data storage at which original image data is to be stored;

in response to receiving the position information request, transmitting the original image position information through the network interface to the image processing device such that the controller transmits first original image position information in response to receiving a first position information request and transmits second original image position information in response to receiving a second position information request, the first position information request and the second position information request being different from each other, a first original image storage position indicated by the first original image position information and a second original image storage position indicated by the second original image position information being different from each other;

receiving the original image data through the network interface from the image processing device that has accessed the management system by using the original image position information;

storing the original image data at the original image storage position in the image data storage;

transmitting code data through the network interface to the image processing device, the code data being for acquiring target image position information indicative of a target image storage position in the image data storage at which target image data is stored based on the original image data, the code data expressing a code image to be displayed on the image processing device;

receiving a target image data request through the network interface from the terminal device that has acquired the target image position information by reading the code image displayed on the image processing device, the target image data request designating the target image storage position indicated by the target image position information and requesting transmission of the target image data; and in response receiving to the target image data request, transmitting the target image data through the network interface to the terminal device.

The image processing device includes: another network interface; a display; and another controller configured to perform:

transmitting the position information request through the another network interface to the management system in response to receiving an instruction inputted from an outside of the image processing device;

in response to the transmission of the position information request, receiving the original image position information through the another network interface from the management system;

transmitting the original image data through the another network interface to the management system by accessing the management system by using the original image position information;

in response to the transmission of the original image data, receiving the code data through the another network interface; and controlling the display to display the code image expressed by the code data.

According to another aspect, a non-transitory computer readable storage medium stores a set of program instructions for a management system. The management system is capable of communicating with both of an image processing device and a terminal device. The management system includes a network interface and a controller. The program instructions, when executed by the management system, cause the management system to perform:

receiving a position information request through the network interface from the image processing device, the position information request being for requesting transmission of original image position information indicative of an original image storage position in an image data storage at which original image data is to be stored;

in response to receiving the position information request, transmitting the original image position information through the network interface to the image processing device such that first original image position information is transmitted in response to receiving a first position information request and second original image position information is transmitted in response to receiving a second position information request, the first position information request and the second position information request being different from each other, a first original image storage position indicated by the first original image position information and a second original image storage position indicated by the second original image position information being different from each other;

receiving the original image data through the network interface from the image processing device that has accessed the management system by using the original image position information;

storing the original image data at the original image storage position in the image data storage;

transmitting code data through the network interface to the image processing device, the code data being for acquiring target image position information indicative of a target image storage position in the image data storage at which target image data is stored based on the original image data, the code data expressing a code image to be displayed on the image processing device;

receiving a target image data request through the network interface from the terminal device that has acquired the target image position information by reading the code image displayed on the image processing device, the target image data request requesting transmission of the target image data by using the target image position information; and in response to receiving the target image data request, transmitting the target image data through the network interface to the terminal device.

BRIEF DESCRIPTION OF THE DRAWINGS

The particular features and advantages of the disclosure will become apparent from the following description taken in connection with the accompanying drawings, in which:

FIG. 8 illustrates URLs obtained when conversion is applied to image data.

DETAILED DESCRIPTION

Figure 1:
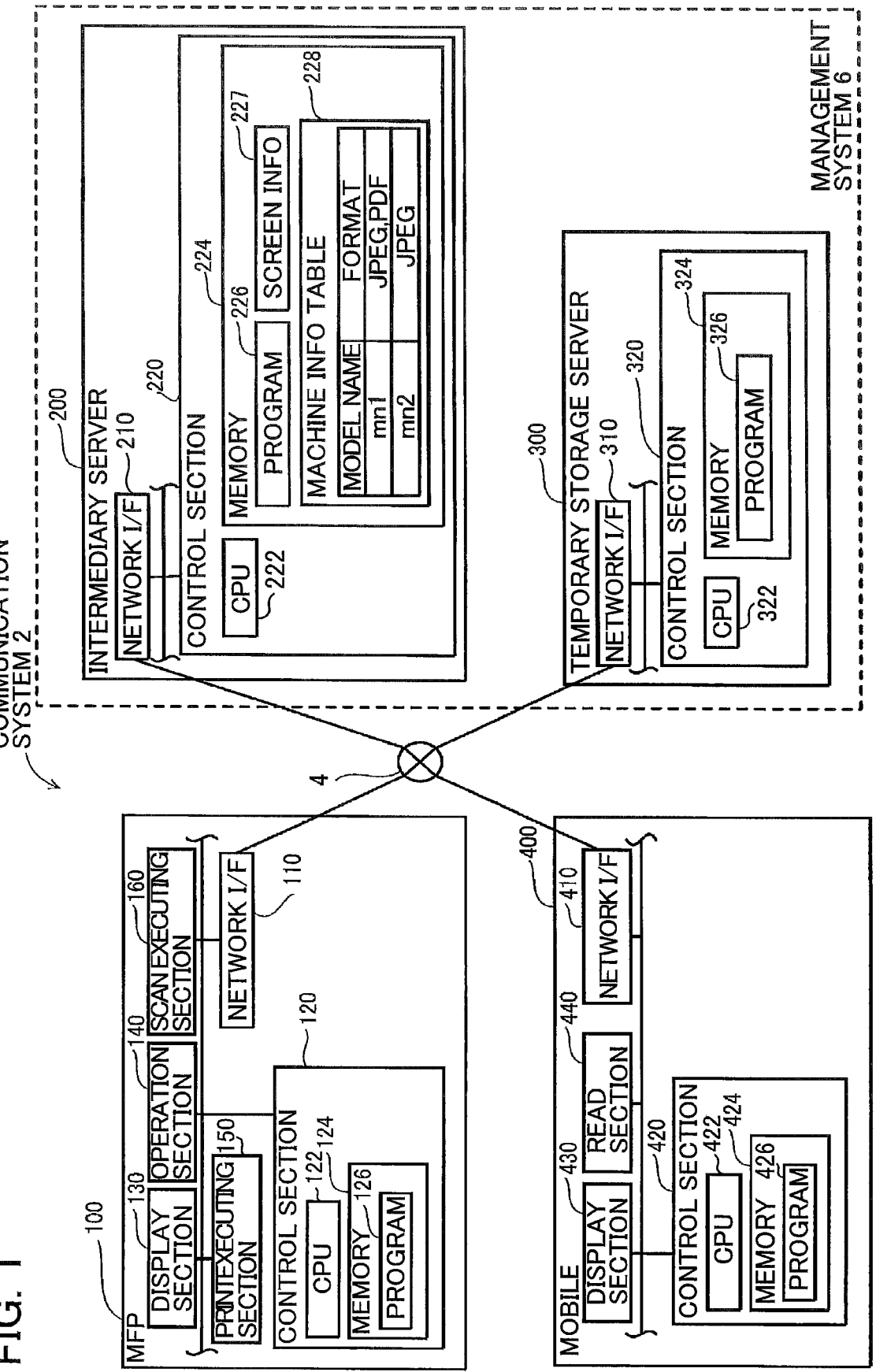
FIG. 1 shows a configuration of a communication system according to an embodiment.

A communication system according to an embodiment will be described while referring to the accompanying drawings wherein like parts and components are designated by the same reference numerals to avoid duplicating description.

As shown in FIG. 1, a communication system 2 includes an MFP (Multifunction Peripheral) 100, a mobile 400 (smartphone, tablet, etc.), and a management system 6. The management system 6 includes an intermediary server 200, and a temporary storage server 300. The MFP 100, intermediary server 200, temporary storage server 300, and mobile 400 are capable of communicating with one another over the Internet 4.

The MFP 100 belongs to a Local Area Network (LAN) used in a house or a hotel in which the MFP 100 is installed and performs communication with the intermediary server 200, temporary storage server 300, and mobile 400 over the LAN and Internet 4.

The mobile 400 uses an LTE (Long Term Evolution) to perform communication with the MFP 100, intermediary server 200, and temporary storage server 300 over the Internet 4. The LTE is a wireless communication system conforming to a communication standard specified by a standards body, 3GPP (3rd Generation Partnership Project).

In the communication system 2, the temporary storage server 300 stores image data transmitted from the MFP 100. The mobile 400 acquires, via the MFP 100 from the intermediary server 200, a URL indicating a storage position of the image data, and accesses the storage position indicated by the acquired URL to receive the image data.

(Configuration of MFP 100)

The MFP 100 includes a network interface (network I/F) 110, a control section 120, a display section 130, an operation section 140, a print executing section 150, and a scan executing section 160. The network interface 110 is an interface for transmitting and receiving signals over a network such as an LAN and the Internet.

The control section 120 includes a CPU 122 and a memory 124. The memory 124 stores a program 126. The memory 124 is, e.g., a RAM, a ROM, or an HDD. The CPU 122 executes various processing according to the program 126 stored in the memory 124.

The display section 130 is a display for displaying various information items. The operation section 140 is provided with a plurality of keys. The user can input various instructions to the MFP 100 by operating the operation section 140. The print executing section 150 executes processing for printing data that is acquired from an outside of the MFP 100. The scan executing section 160 executes processing for scanning a loaded document.

(Configuration of Intermediary Server 200)

The intermediary server 200 includes a network interface (network I/F) 210 and a control section 220. The network interface 210 is an interface for transmitting and receiving signals over a network such as the Internet.

The control section 220 includes a CPU 222 and a memory 224. The memory 224 stores a program 226, screen information 227, and a machine information table 228. The memory 224 is, e.g., a RAM, a ROM, or an HDD. The CPU 222 executes various processing according to the program 226 stored in the memory 224. The screen information 227 includes data of screens to be displayed on the display section 130 of the MFP 100. Transmission of data of one of the screens among the screen information 227 from the intermediary server 200 to the MFP 100 allows the MFP 100 to display the screen based on the data of the screen on the display section 130.

The machine information table 228 previously stores model names and formats such that at least one format corresponds to each model name. The model names include the model names of all types of the MFP that are provided by a vender who owns the intermediary server 200. The at least one format that is associated with each model name includes formats of image data that the MFP of the subject model can generate. Every time an MFP of a new type is provided by the vendor, new model name and format are correspondingly added to the machine information table 228.

(Configuration of Temporary Storage Server 300)

The temporary storage server 300 includes a network interface (network I/F) 310 and a control section 320. The network interface 310 is an interface for transmitting and receiving signals over a network such as the Internet.

The control section 320 includes a CPU 322 and a memory 324. The memory 324 stores a program 326. The memory 324 is, e.g., a RAM, a ROM, or an HDD. The CPU 322 executes various processing according to the program 326 stored in the memory 324.

(Configuration of Mobile 400)

The mobile 400 includes a network interface (network I/F) 410, a control section 420, a display section 430, and a read section 440. The network interface 410 is an interface for transmitting and receiving signals over a network, such as the Internet, by using the LTE.

The control section 420 includes a CPU 422 and a memory 424. The memory 424 stores a program 426. The memory 424 is, e.g., a RAM, a ROM, or an HDD. The CPU 422 executes various processing according to the program 426 stored in the memory 424.

The display section 430 is a display for displaying various information items. The display section 430 functions also as a touch panel for receiving a user operation. The read section 440 is a camera for reading a QR code. Reading the QR code by the read section 440 allows the mobile 400 to acquire information included in the QR code.

(Operation of Communication System 2)

Figure 2:
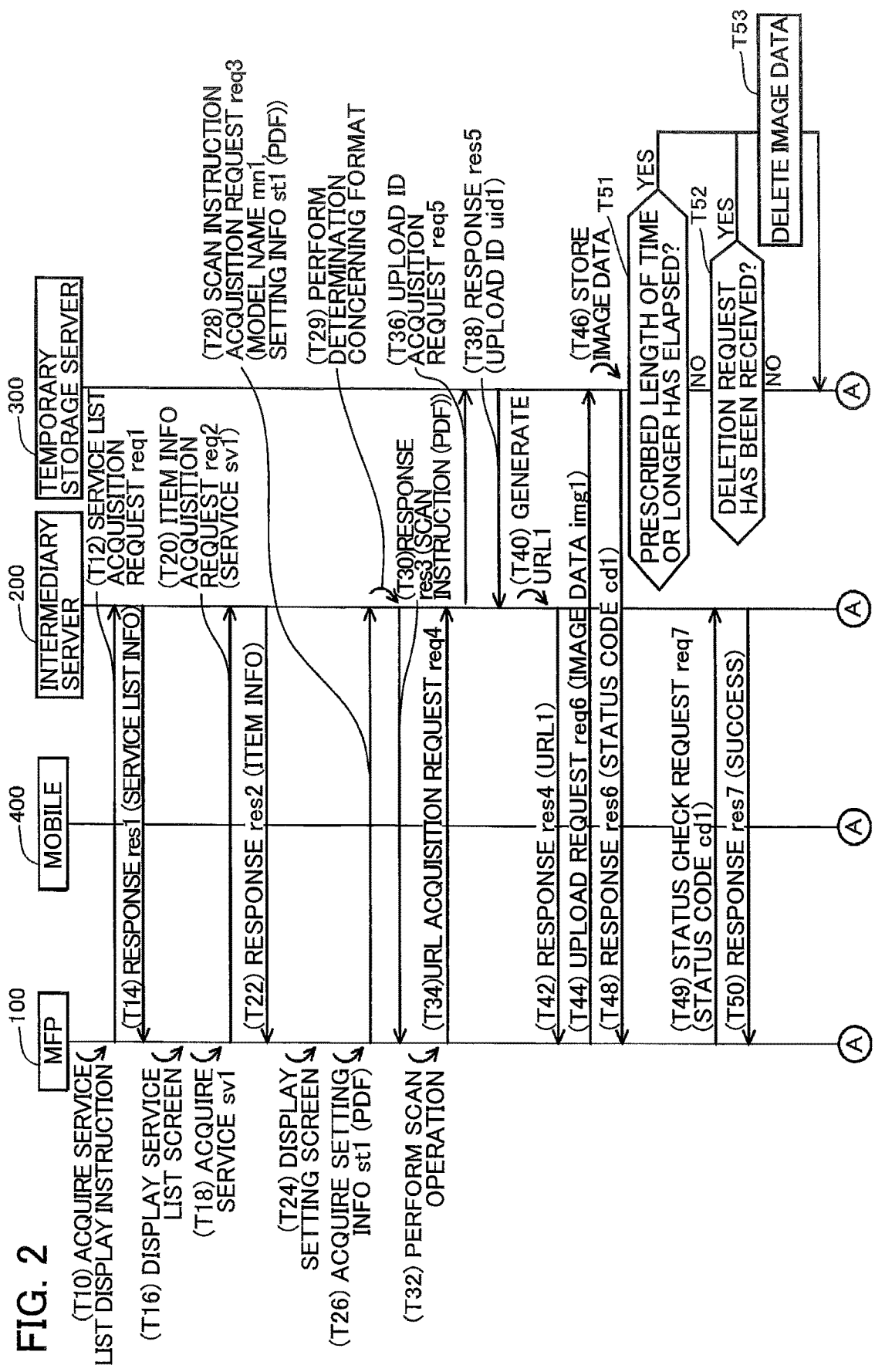
FIG. 2 is part of a sequence diagram showing how the communication system operates when no conversion is applied to image data.
Figure 3:
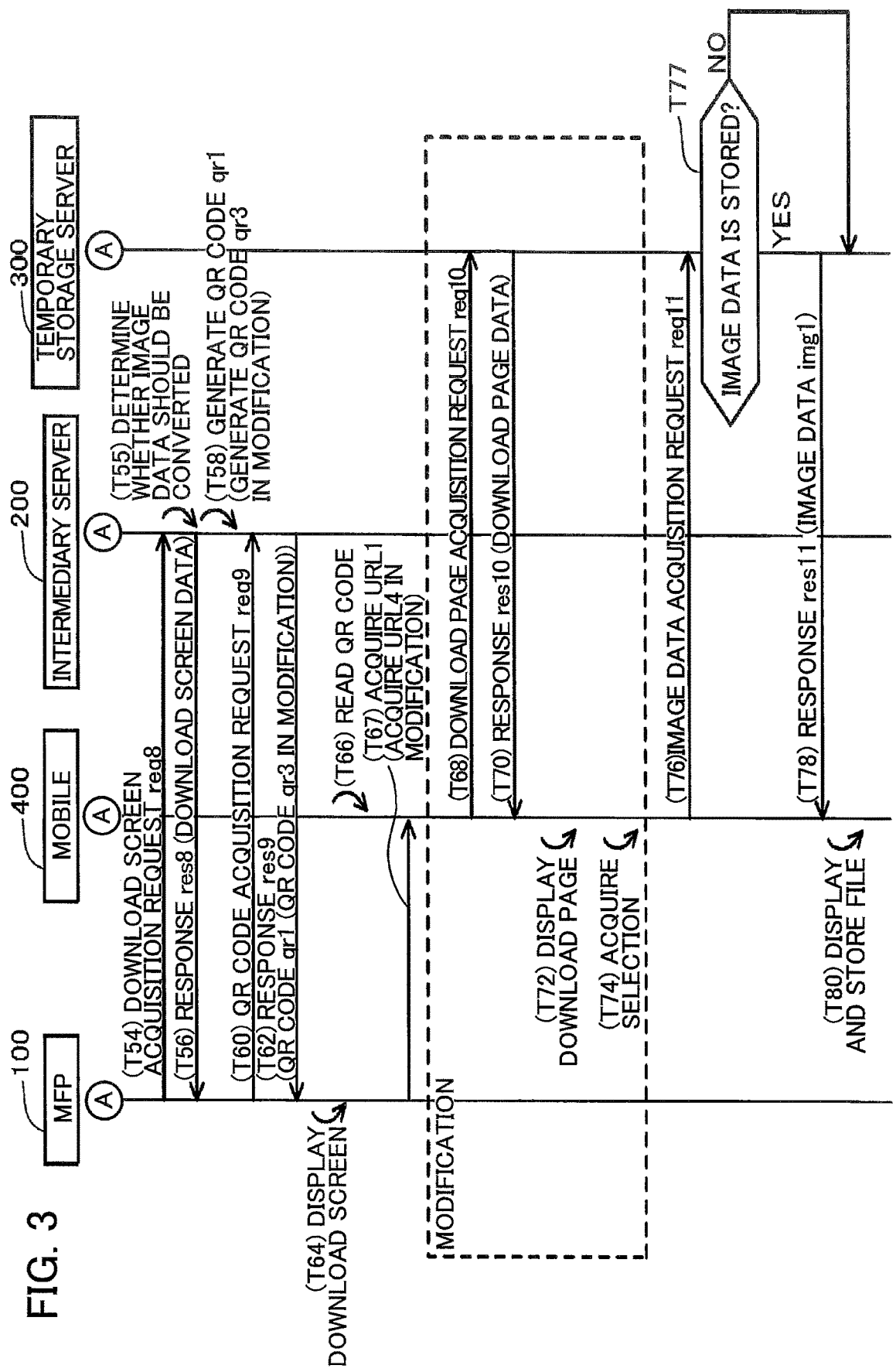
FIG. 3 is remaining part of the sequence diagram for when no conversion is applied to image data.

With reference to FIGS. 2 and 3, processing that is performed by the communication system 2 when no conversion is applied to image data will be described. Processing of T68 to T74 is illustrated as a modification.

First, in T10, the MFP 100 receives a service list display instruction from the user. Specifically, the user operates the operation section 140 of the MFP 100 to select a button for displaying a list of services available in the MFP 100 on a screen previously displayed on the display section 130.

In T12, based on the service list display instruction, the MFP 100 transmits a service list acquisition request "req1" to the intermediary server 200. The service list acquisition request "req1" is a request for acquiring service list information representing a list of the services available in the MFP 100.

In T14, the intermediary server 200 transmits a response "res1" to the MFP 100. The response "res1" includes the service list information. The service list information is information representing a list of the services available in the MFP 100 and is also information for accepting, through the operation section 140, selection of a service that the user wants to use.

In T16, the MFP 100 displays, on the display section 130, a service list screen based on the service list information.

In T18, the MFP 100 accepts selection of a service. Specifically, the user operates the operation section 140 to select a service that he or she desires from the service list screen displayed on the display section 130. Here, the user selects a scan service "sv1" for the mobile 400 to acquire image data that is obtained based on a scan operation in the MFP 100.

In T20, the MFP 100 transmits an item information acquisition request "req2" to the intermediary server 200. The item information acquisition request "req2" is a request for acquiring item information representing items that should be set for the service selected in T18.

In T22, the intermediary server 200 transmits a response "res2". The response "res2" includes the item information. The items represented by the item information are, e.g., "file format", "sheet size", and "color/monochrome". The item of the file format includes formats of all types (JPEG, PDF, etc.) of image data that can be generated by the temporary storage server 300. The sheet size is associated with the file format, so that selectable sheet size differs depending on the file format. For example, "A4" and "letter" are associated with JPEG, so that when JPEG is selected as the file format, "A4" or "letter" can be selected as the sheet size.

In T24, the MFP 100 displays, on the display section 130, a setting screen based on the received item information.

In T26, the MFP 100 accepts the scan service setting from the user. Specifically, the user operates the operation section 140 to perform setting concerning the "file format", "sheet size", and "color/monochrome" on the setting screen displayed on the display section 130. For example, the user selects "PDF" as the "file format", "A4" as the "sheet size", and "color" as the "color/monochrome". According to the user's selection, the MFP 10 acquires setting information "st1" including "PDF", "A4", and "color". That is, in the scan service, the MFP 100 scans an image in a state where the "file format", "sheet size", and "color/monochrome" have been set beforehand.

In T28, the MFP 100 transmits a scan instruction acquisition request "req3" to the intermediary server 200. The scan instruction acquisition request "req3" is a request for acquiring a scan instruction from the intermediary server 200. The scan instruction acquisition request "req3" includes a model name "mn1" of the MFP 100 and the setting information "st1".

In T29, the intermediary server 200 determines whether or not the MFP 100 can generate image data of the format included in the setting information "st1". Specifically, the intermediary server 200 extracts, from the machine information table 228, the at least one format (JPEG, PDF) that corresponds to the model name "mn1". The intermediary server 200 determines whether or not the format included in the setting information "st1" coincides with any one of the extracted formats. Here, the format included in the setting information "st1" is "PDF", and the extracted formats are "JPEG" and "PDF", so that the intermediary server 200 determines that the MFP 100 can generate image data of the format included in the setting information "st1".

In T30, the intermediary server 200 transmits a response "res3" to the MFP 100. The response "res3" includes a scan instruction. The scan instruction is adapted to instruct the MFP 100 to scan an image according to the setting information "st1".

In T32, in response to the user operation of loading a document and selecting the scan, the MFP 100 performs document scan operation according to the setting information "st1". That is, the MFP 100 generates image data "img1" as scan data from the loaded document according to the setting information "st1" ("PDF", "A4", "color"). When the user intends to generate a PDF file containing a plurality of pages, the MFP 100 scans images of the plurality of pages. Upon acquisition of image data of the plurality of pages, the MFP 100 generates one PDF file including a plurality of image data.

In T34, the MFP 100 transmits a URL acquisition request "req4" to the intermediary server 200. The URL acquisition request "req4" is a request for acquiring a "URL1" indicating an upload destination location of the image data "img1".

In T36, the intermediary server 200 transmits an upload ID acquisition request "req5" to the temporary storage server 300. The upload ID acquisition request "req5" is a request for acquiring an upload ID for use in generating the "URL1". A generation method for the "URL1" will be described later.

In T38, the temporary storage server 300 transmits a response "res5" to the intermediary server 200. The response "res5" includes an upload ID "uid1". The upload ID "uid1" is an ID for generating the "URL1" which indicates a storage position in the memory 324 of the temporary storage server 300 in which the image data "img1" is to be stored. The upload ID "uid1" is, e.g., "001".

In T40, the intermediary server 200 generates the "URL1". The "URL1" indicates the storage position in the memory 324 of the temporary storage server 300 in which the image data "img1" is to be stored.

Figure 4:
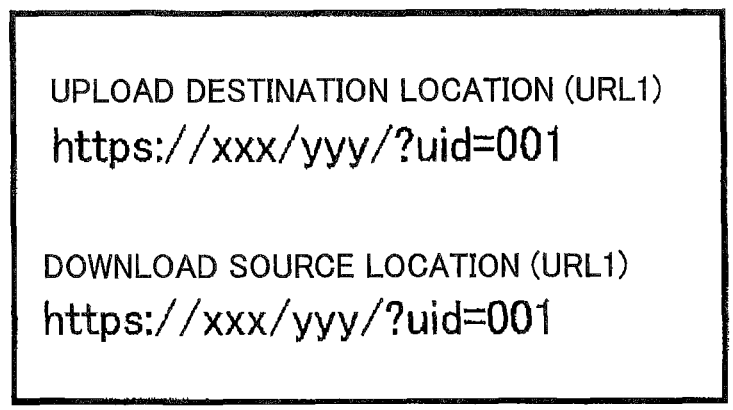
FIG. 4 illustrates URLs obtained when no conversion is applied to image data.

FIG. 4 illustrates URLs obtained when no conversion is applied to the image data. The "URL1" is a URL that indicates the upload destination location as shown in FIG. 4. The "URL1" is composed of a parameter "xxx" for identifying the temporary storage server 300, a parameter "yyy" for identifying the memory 324 of the temporary storage server 300, and a parameter "uid=001" for identifying the storage position in the memory 324 in which the image data "img1" is to be stored. The intermediary server 200 previously stores a part of a string representing the "URL1", that is, "https://xxx/yyy/?uid=". The intermediary server 200 adds the upload ID "uid1" (001) acquired in T38 to the end of the above-described string to generate the "URL1".

In T42, the intermediary server 200 transmits a response "res4" to the MFP 100. The response "res4" includes the "URL1".

In T44, the MFP 100 uses the "URL1" to transmit an upload request "req6" to the temporary storage server 300. The upload request "req6" includes the image data "img1". More specifically, the MFP 100 refers to the parameter "xxx" of the "URL1" to identify the temporary storage server 300 to which the image data "img1" is to be transmitted. The MFP 100 transmits the parameters "yyy" and "uid=001" and image data "img1" to the identified temporary storage server 300.

In T46, the temporary storage server 300 stores the image data "img1". Specifically, the temporary storage server 300 stores the image data "img1" in a storage position identified by the parameter "uid=001" in the memory 324 identified by the parameter "yyy".

In T48, the temporary storage server 300 transmits a response "res6" to the MFP 100. The response "res6" includes a status code "cd1". The status code "cd1" indicates a success of the upload of the image data "img1" to the temporary storage server 300. However, the MFP 100 does not have a function of interpreting the status code. Therefore, even when receiving the status code "cd1", the MFP 100 does not know success or failure of the upload of the image data "img1" to the temporary storage server 300. The status code can be interpreted by the intermediary server 200. Thus, the MFP 100 needs to transmit the status code "cd1" to the intermediary server 200 so as to check success or failure of the upload of the image data "img1" to the temporary storage server 300.

In T49, the MFP 100 transmits a status check request "req7" to the intermediary server 200. The status check request "req7" is a request for checking a status indicated by the status code "cd1".

In T50, the intermediary server 200 transmits a response "res7" to the MFP 100. The response "res7" includes information representing a status corresponding to the status code "cd1". As described above, the status code "cd1" indicates the success of the upload of the image data "img1" to the temporary storage server 300. Therefore, when receiving the response "res7" from the intermediary server 200, the MFP 100 recognizes the success of the upload of the image data "img1" to the temporary storage server 300.

In response to the transmission of the response "res6" from the temporary storage server 300 to MFP 100 in T48, processing of T51 to T53 (image data deletion processing) is executed in parallel to the processing of T49 and subsequent steps.

In T51, the temporary storage server 300 determines whether or not a prescribed length of time or longer has elapsed after the storage of the image data "img1". The prescribed length of time is, e.g., one hour. When determining that the prescribed length of time or longer has elapsed (YES in T51), the temporary storage server 300 proceeds to T53. On the other hand, when determining that the prescribed length of time or longer has not yet elapsed (NO in T51), the temporary storage server 300 proceeds to T52.

In T52, the temporary storage server 300 determines whether or not the temporary storage server 300 has received a deletion request from the MFP 100. The deletion request is a request for deleting the image data "img1" from the storage position in the memory 324. When the user selects deletion of the image data "img1" on the MFP 100, the deletion request is transmitted from the MFP 100 to temporary storage server 300. When receiving the deletion request (YES in T52), the temporary storage server 300 proceeds to T53.

In T53, the temporary storage server 300 deletes the image data "img1" from the storage position in the memory 324. This prevents the image data "img1" from continuing to be stored in the storage position in the memory 324, whereby the management system 6 can effectively use the memory 324. This further reduces a risk of leakage of the image data "img1" by an illegal access.

When it is determined that the temporary storage server 300 has not received the deletion request (NO in T52), or when the processing of T53 has been completed, the image data deletion processing is ended. The image data deletion processing is periodically repeated until the temporary storage server 300 transmits a response "res11" to the mobile 400 in T78.

In T54, the MFP 100 transmits a download screen acquisition request "req8" to the intermediary server 200. The download screen is a screen that is displayed on the display section 130 of the MFP 100 for the purpose of allowing the mobile 400 to acquire the image data "img1".

Figure 5:
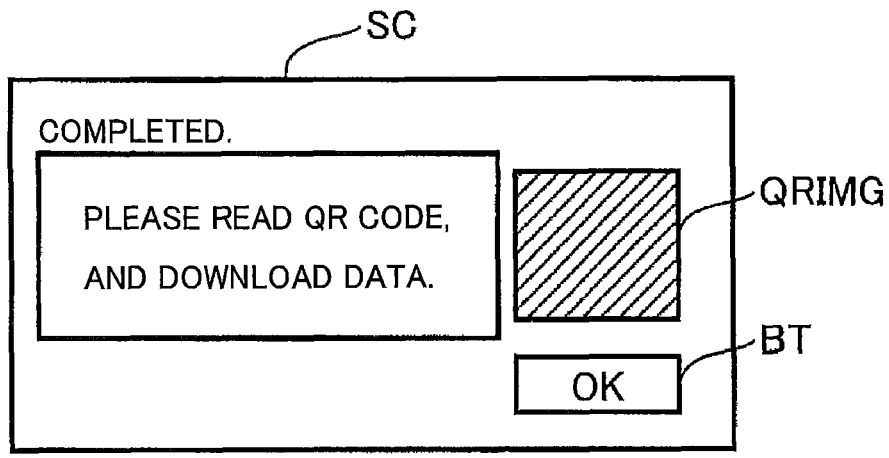
FIG. 5 is a view illustrating a download screen.

FIG. 5 is a view illustrating the download screen. A download screen SC of FIG. 5 includes a code image QRIMG indicated by a QR code "qr1". The QR code "qr1" is obtained by encoding the "URL1". The "URL1" indicates the storage position of the image data "img1" and download source location thereof. That is, the "URL1" is the URL indicated by the download source location in FIG. 4. The user uses the mobile 400 to read the code image QRIMG to thereby allow the mobile 400 to acquire the "URL1". The user depresses a button BT on the download screen SC after acquiring the code image QRIMG using the mobile 400, thereby allowing the MFP 100 to switch a screen displayed on the display section 130 from the download screen SC to the screen previously displayed in T10.

In T55, the intermediary server 200 determines whether or not the image data "img1" should be converted into data of a different format. Specifically, the determination of T55 is performed based on the determination of T29 on whether or not the MFP 100 can generate the image data of the format included in the setting information "st1". Here, in T29, the MFP 100 determines that the MFP 100 can generate PDF image data, so that the intermediary server 200 determines that the image data "img1" should not be converted in the temporary storage server 300.

In T56, the intermediary server 200 transmits a response "res8" to the MFP 100. The response "res8" includes download screen data indicating the download screen. However, the download screen data includes only a URL indicating a storage position of the QR code "qr1" but not the QR code "qr1" itself. Thus, in order to display the code image QRIMG in the download screen, it is necessary for the MFP 100 to newly acquire the QR code "qr1" by using the URL indicating the storage position of the QR code "qr1".

In T58, the intermediary server 200 generates the above-mentioned QR code "qr1" in response to the transmission of the response "res8".

In T60, the MFP 100 transmits a QR code acquisition request "req9" to the intermediary server 200. The QR code acquisition request "req9" is a request for acquiring the QR code "qr1".

In T62, the intermediary server 200 transmits a response "res9" to the MFP 100. The response "res9" includes the QR code "qr1". By receiving the response "res9", the MFP 100 can display the download screen including the code image QRIMG on the display section 130.

In T64, the MFP 100 displays the download screen on the display section 130.

In T66, the mobile 400 reads the code image QRIMG in the download screen displayed on the display section 130 of the MFP 100. Specifically, the user uses the read section 440 of the mobile 400 to read the code image QRIMG. As a result, the mobile 400 acquires the QR code "qr1".

In T67, the mobile 400 interprets the QR code "qr1" to acquire the "URL1".

In T76, the mobile 400 uses the "URL1" to transmit an image data acquisition request "req11" to the temporary storage server 300. Specifically, the mobile 400 refers to the parameter "xxx" of the "URL1" to identify the temporary storage server 300 that stores the image data "img1". Further, the mobile 400 transmits the parameters "yyy" and "uid=001" to the identified temporary storage server 300.

In T77, the temporary storage server 300 determines whether or not the image data is stored in a storage position in the memory 324 that corresponds to the parameters "yyy" and "uid=001". For example, when the image data has been deleted in T53, the image data is not stored in the storage position in the memory 324. When the image data is not stored (NO in T77), the processing is ended. On the other hand, when the image data is stored (YES in T77), the temporary storage server 300 proceeds to T78.

In T78, the temporary storage server 300 transmits a response "res11" to the mobile 400. The response "res11" includes the image data "img1". The temporary storage server 300 uses the parameters "yyy" and "uid=001", which are received in T76 to identify the storage position of the image data "img1" in the memory 324, to identify the image data "img1". The temporary storage server 300 then transmits the identified image data "img1".

In T80, the mobile 400 displays an image based on the received image data "img1" on the display section 430. Further, in response to user operation, the mobile 400 stores the image data "img1" in the memory 424.

Figure 6:
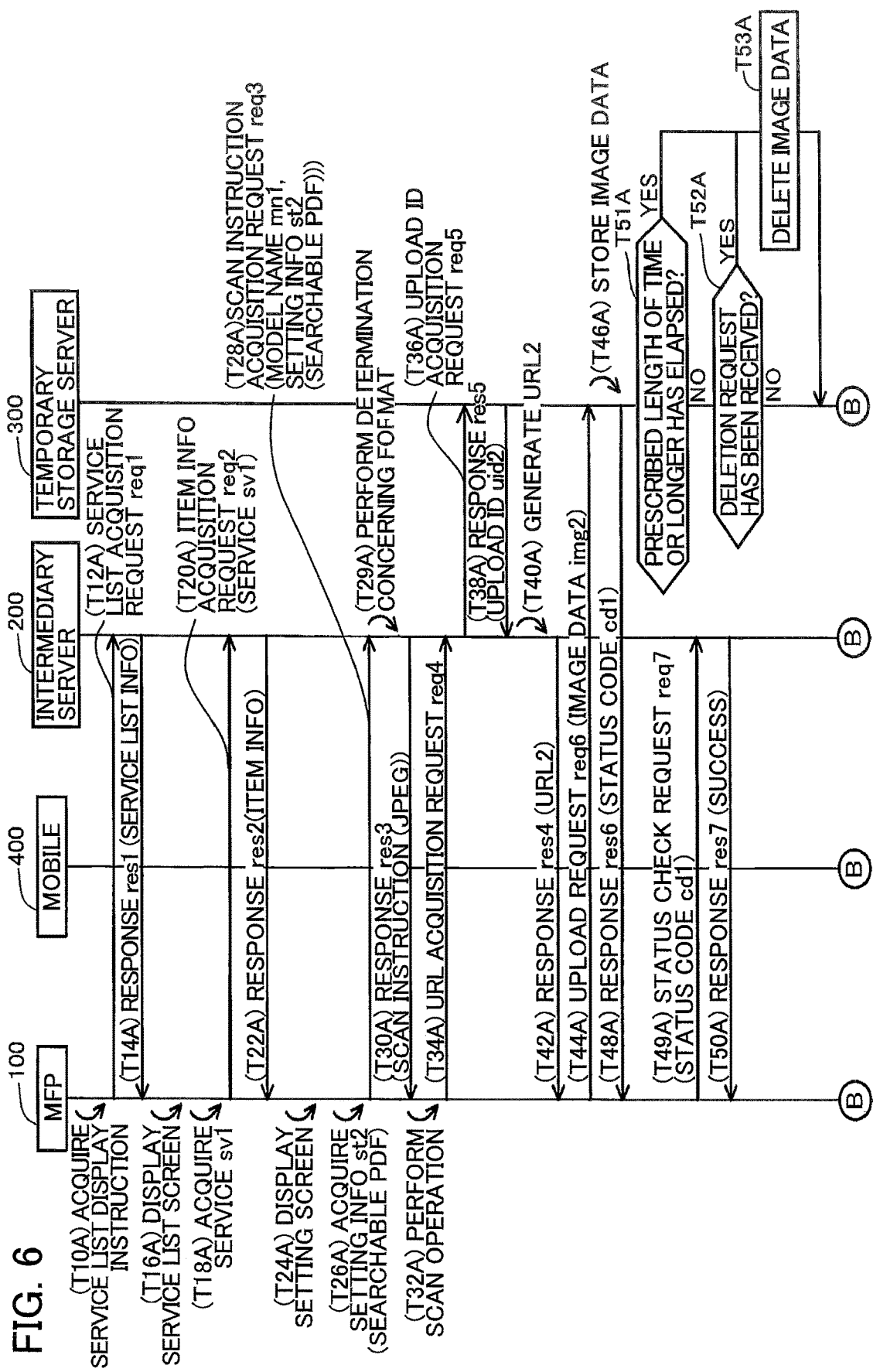
FIG. 6 is part of a sequence diagram showing how the communication system operates when conversion is applied to image data.
Figure 7:
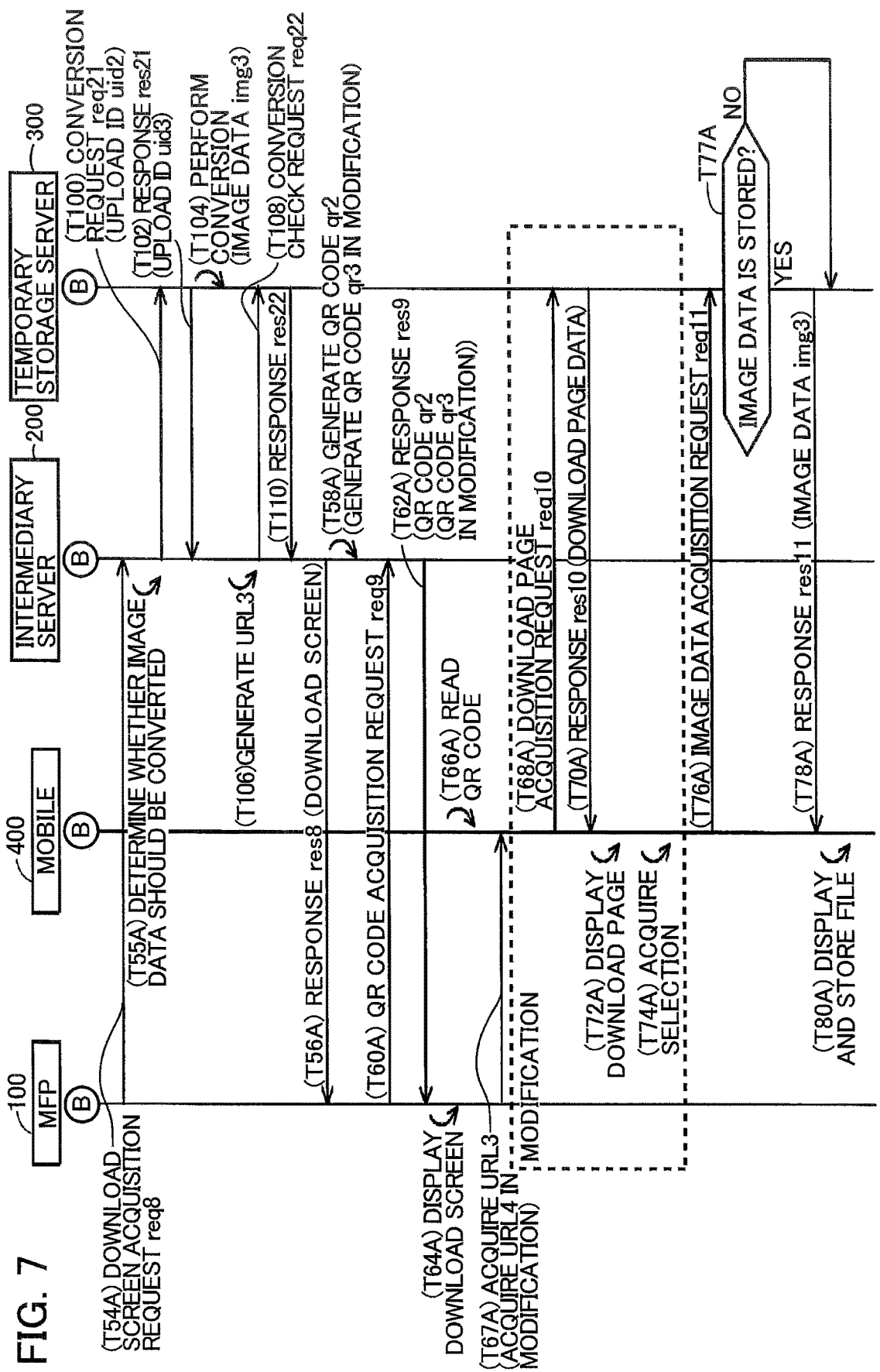
FIG. 7 is remaining part of the sequence diagram for when conversion is applied to image data.

After completion of the processing illustrated in FIGS. 2 and 3, when the MFP 100 receives another service list display instruction from the user, the processing illustrated in FIGS. 6 and 7 is started (continued from the processing of FIGS. 2 and 3) if conversion has to be applied to image data. In the operation of FIGS. 2 and 3, the intermediary server 200 determines in T29 that the MFP 100 can generate image data of a format included in the setting information "st1" and, correspondingly, determines in T55 that the image data "img1" should not be converted into data of a different format. Thus, the mobile 400 receives, from the temporary storage server 300, the image data "img1" that the MFP 100 has acquired by the scan operation. That is, the image data that the MFP 100 has transmitted to the temporary storage server 300 and the image data that the mobile 400 receives from the temporary storage server 300 are the same.

On the other hand, in the operation of FIGS. 6 and 7, the intermediary server 200 determines in T29A that the MFP 100 cannot generate image data of a format included in setting information "st2" and, correspondingly, determines in T55A that image data "img2" should be converted into data of a different format. Thus, the mobile 400 receives, from the temporary storage server 300, image data "img3" obtained by converting the image data "img2" that the MFP 100 has acquired by the scan operation. That is, the image data that the MFP 100 has transmitted to the temporary storage server 300 and the image data that the mobile 400 receives from the temporary storage server 300 are different.

The processing of T10A to T24A is the same as the processing of T10 to T24 in FIGS. 2 and 3, so description thereof will be omitted.

In T26A, the MFP 100 accepts the scan service setting from the user.

Here, the user selects "Searchable PDF" as the "file format", "A4" as the "sheet size", and "color" as the "color/monochrome". According to the user's selection, the MFP 10 acquires setting information "st2" including "Searchable PDF", "A4", and "color". The Searchable PDF is a PDF format in which character information is converted into text data. Thus, when the format is "Searchable PDF", the user can perform keyword search or text copy/paste.

In T28A, the MFP 100 transmits a scan instruction acquisition request "req3" to the intermediary server 200. The scan instruction acquisition request "req3" includes a model name "mn1" of the MFP 100 and setting information "st2".

In T29A, the intermediary server 200 determines whether or not the MFP 100 can generate image data of the format included in the setting information "st2". Here, the format included in the setting information "st2" is "Searchable PDF", and the formats extracted from the machine information table 228 are "JPEG" and "PDF", so that the intermediary server 200 determines that the MFP 100 cannot generate image data of the format included in the setting information "st2".

In T30A, the intermediary server 200 transmits a response "res3" to the MFP 100. The response "res3" includes a scan instruction. The intermediary server 200 determines in T29A that the MFP 100 cannot generate the image data of the format included in the setting information "st2" and, accordingly, instructs, in T30A, the MFP 100 to perform the scan with the format changed to "JPEG" which is a format that can be generated. That is, with the scan instruction, the intermediary server 200 instructs the MFP 100 to scan an image according to setting information "st3" including "JPEG", "A4", and "color".

In T32A, in response to the user operation of placing a document and selecting the scan on the display section 430, the MFP 100 performs document scan operation according to the setting information "st3". That is, the MFP 100 generates image data "img2" as scan data from the loaded document according to the setting information "st3" ("JPEG", "A4", "color").

In T34A, the MFP 100 transmits a URL acquisition request "req4" to the intermediary server 200. The URL acquisition request "req4" is a request for acquiring a "URL2" indicating an upload destination location of the image data "img2".

In T36A, the intermediary server 200 transmits an upload ID acquisition request "req5" to the temporary storage server 300. The upload ID acquisition request "req5" is a request for acquiring an upload ID for use in generating "URL2" different from the "URL1".

In T38A, the temporary storage server 300 transmits a response "res5" to the intermediary server 200. The response "res5" includes an upload ID "uid2". The upload ID "uid2" is an ID for generating the "URL2" which indicates a storage position in the memory 324 of the temporary storage server 300 in which the image data "img2" is to be stored. The upload ID "uid2" is, e.g., "002".

In T40A, the intermediary server 200 generates the "URL2". FIG. 8 illustrates the URLs when conversion is applied to the image data. The "URL2" is a URL of FIG. 8 that indicates the upload destination location. The generation method for the "URL2" is the same as that for the "URL1".

The processing of T42A to T53A is the same as the processing of T42 to T53 in FIGS. 2 and 3, so description thereof will be omitted.

In T54A, the MFP 100 transmits a download screen acquisition request "req8" to the intermediary server 200.

In T55A, the intermediary server 200 determines whether or not the image data "img2" should be converted into data of a different format. Specifically, the determination of T55A is performed based on the determination of T29A on whether or not the MFP 100 can generate the image data of the format included in the setting information "st2". Here, in T29A, the MFP 100 determines that the MFP 100 cannot generate Searchable PDF image data, so that the intermediary server 200 determines that the image data "img2" should be converted into the Searchable PDF image data in the temporary storage server 300.

In T100, the intermediary server 200 transmits a conversion request "req21" to the temporary storage server 300. The conversion request "req21" is a request for causing the temporary storage server 300 to convert the image data "img2" of a JPEG format into image data "img3" of a Searchable PDF format. The conversion request "req21" includes the upload ID "uid2" corresponding to the image data "img2".

In T102, the temporary storage server 300 transmits a response "res21" to the intermediary server 200. The response "res21" includes an upload ID "uid3". The upload ID "uid3" is an ID for generating a URL3 and indicates a storage position in the memory 324 in which the image data "img3" is to be stored. The URL3 indicates a download source location of the image data "img3". The upload ID "uid3" is, e.g., "003".

In T104, the temporary storage server 300 extracts the image data "img2" corresponding to the upload ID "uid2" received in T100 and converts the format thereof from JPEG into Searchable PDF. As a result, the image data "img3" is generated. Thus, the management system 6 can transmit, to the mobile 400, the image data "img3" that is converted from the image data "img2" received from the MFP 100.

In T106, the intermediary server 200 generates the URL3. Specifically, the URL3 is a URL of FIG. 8 that indicates the download source location. The generation method for the URL3 is the same as those for the "URL1" and "URL2".

In T108, the intermediary server 200 transmits a conversion check request "req22" to the temporary storage server 300. The conversion check request "req22" is a request for checking whether or not the conversion from the image data "img2" into image data "img3" has been completed.

In T110, the temporary storage server 300 transmits response "res22" to the intermediary server 200. The response "res22" includes information indicating that the conversion from the image data "img2" into image data "img3" has been completed. When the conversion has not yet been completed, the response "res22" includes information indicating that the conversion from the image data "img2" into image data "img3" has not been completed. In this case, the intermediary server 200 again transmits the conversion check request "req22" after a prescribed time period has elapsed. When the intermediary server 200 receives the response "res22" including information indicating that the conversion has been completed, the intermediary server 200 proceeds to T56A.

In order to upload the Searchable PDF file containing a plurality of pages, the processing of T32A to T50A is repeated unlike the operation described in FIGS. 2 and 3. Here, the MFP 100 acquires the JPEG image data in T32A. As for JPEG, a file containing a plurality of pages cannot be generated. Thus, it is necessary for the MFP 100 to upload one-page JPEG image data to the temporary storage server 300 (T44A) and to confirm the success of the upload of the JPEG image data (T50A), before acquiring JPEG image data of a subsequent page (T32A).

In order to upload a plurality of sets of image data, processing of T38A is repeated and, accordingly, the intermediary server 200 acquires upload IDs of the plurality of sets of image data. Thus, the conversion request "req21" that the intermediary server 200 transmits in T100 includes the upload IDs of the plurality of sets of JPEG image data. After transmitting the response "res21" in T102, the temporary storage server 300 extracts in T104 a plurality of sets of JPEG image corresponding to the upload IDs included in the conversion request "req21". The temporary storage server 300 generates, from the plurality of sets of JPEG image data, a set of Searchable PDF image data "img3" containing a plurality of pages.

The processing of T56A to T80A is the same as the processing of T56 to T80 in FIGS. 2 and 3, so description thereof will be omitted. However, the download screen SC includes a code image QRIMG indicated by a QR code "qr2". Since the image data "img2" is converted into the image data "img3" in T104, the QR code "qr2" generated in T58A is a code obtained by encoding, not the "URL2", but the URL3. The URL3 indicates the storage position of the image data "img3" and a download source location for downloading the image data "img3". Thus, the user uses the mobile 400 to read the code image QRIMG to thereby allow the mobile 400 to acquire the URL3.

As described above, in the present embodiment, when the management system 6 receives the URL acquisition request "req4" in FIG. 2, the management system 6 transmits the "URL1". When the management system 6 receives the URL acquisition request "req4" in FIG. 6 at a timing that is different from the timing when the management system 6 received the URL acquisition request "req4" in FIG. 2, the management system 6 transmits the "URL2" that is different from the "URL1". The MFP 100 uses the "URL1" to transmit the image data "img1" and uses the "URL2" to transmit the image data "img2". As a result, the management system 6 stores the image data "img1" and image data "img2" in positions that are different from each other in correspondence with the difference in the timings when the management system 6 has received the corresponding URL acquisition requests "req4". Further, for example, it is conceivable to configure such a system in which a device other than the management system 6 determines the URL. In such a conceivable configuration, however, if the program of the management system 6 is updated, the device other than the management system 6 becomes unable to adequately determine the URL, which may result in a failure of the processing of storing the image data "img" in the management system 6. On the other hand, in the present embodiment, the same management system 6 performs both determining the URL and storing the image data "img", thereby suppressing a failure of the processing of storing the image data "img". Thus, the management system 6 can adequately store the image data "img1" and image data "img2".

It is noted that after the processing illustrated in FIGS. 6 and 7 is completed, when the MFP 100 receives another service list display instruction from the user, a processing that is the same as the processing illustrated in FIGS. 2 and 3 or FIGS. 6 and 7 is started depending on whether or not conversion has to be applied to image data. During the thus started processing, the management system 6 newly receives the URL acquisition request "req4" from the MFP 100 in T34 or T34A. The management system 6 transmits in T42 or T42A to the MFP 100 such "URL" that is different from both of the "URL1" and "URL2" that the management system 6 already transmitted to the MFP 100 This is because the timing when the management system 6 has newly received the URL acquisition request "req4" is different from the timings when the management system 6 received the URL acquisition requests "req4" in the already-executed processes of FIGS. 2 and 3 and FIGS. 6 and 7.

(Correspondence Relationship)

The MFP 100 is an example of an image processing device. The intermediary server 200 is an example of a "first management device", and the temporary storage server 300 is an example of a "second management device". The mobile 400 is an example of a "terminal device". The memory 324 of the temporary storage server 300 is an example of an "image data storage". The memory 224 of the intermediary server 200 is an example of a "correspondence table storage", and the machine information table 228 is an example of a "correspondence table". The memory 324 of the temporary storage server 300 and the memory 224 of the intermediary server 200 are an example of a "non-transitory computer readable storage medium".

In FIGS. 2 and 3, the image data "img1" is an example of "original image data" and an example of "target image data". The "URL1" is an example of "original image position information" and an example of "target image position information". The QR code "qr1" is an example of "code data".

In FIGS. 6 and 7, the image data "img2" is an example of "original image data", and the image data "img3" is an example of "target image data". The "URL2" is an example of "original image position information", and the URL3 is an example of "target image position information". The QR code "qr2" is an example of "code data".

The URL acquisition request "req4" in T34 is an example of a "first position information request", and the URL acquisition request "req4" in T34A is an example of a "second position information request". The "URL1" is an example of "first original image position information", and the "URL2" is an example of "second original image position information".

T34 and T34A are each an example of "receiving a position information request". T42 and T42A are each an example of "transmitting original image position information". T44 and T44A are each an example of "receiving original image data". T46 and T46A are each an example of "storing original image data".

T62 and T62A are each an example of "transmitting code data". T76 and T76A are each an example of "receiving a target image data request". T78 and T78A are each an example of "transmitting target image data".

T40 and T40A are each an example of "generating original image position information". T104 is an example of "converting original image data into target image data". T28 and T28A are each an example of "receiving machine information of the image processing device and format information indicative of a format of the target image data". T29 and T29A are each an example of "determining whether or not the format information that is stored in the correspondence table in association with the received machine information includes the received format information". T53 and T53A are examples of "deleting original image data".

While the description has been made in detail with reference to specific embodiment thereof, it would be apparent to those skilled in the art that various changes and modifications may be made therein without departing from the spirit and scope of the above described embodiment.

First Modification

In the sequence diagrams of FIGS. 2 and 3, in T66 and T67, the mobile 400 acquires the "URL1" indicating the storage position of the image data "img1" by reading the QR code "qr1". Alternatively, however, the mobile 400 may acquire a "URL4", which indicates the storage position of a download page for downloading the image data "img1", by reading a QR code "qr3". Specific description will be made using FIG. 3. The present modification can also be applied to the sequence diagrams of FIGS. 6 and 7.

In T58, the intermediary server 200 generates a QR code "qr3" which is obtained by encoding the "URL4".

In T62, the intermediary server 200 transmits a response "res9" including the QR code "qr3".

In T67, the mobile 400 interprets the QR code "qr3" to acquire the "URL4" indicative of the storage position of a download page for downloading the image data "img1".

In T68, the mobile 400 uses the "URL4" to transmit a download page acquisition request "req10" to the temporary storage server 300.

In T70, the temporary storage server 300 transmits a response "res10" to the mobile 400. The response "res10" includes download page data. The download page is a page (page image) showing a thumbnail image of the image data "img1" stored in T46 and accepting the selection of desired image data from the user. The download page data includes the "URL1" indicative of the storage position of the image data "img1".

In T72, the mobile 400 displays, on the display section 430, the download page based on the received download page data.

In T74, the mobile 400 accepts the selection of the image data.

Specifically, the user checks on the display section 430 for the thumbnail image in the download page and selects the image data "img1".

In T76, the mobile 400 transmits the image data acquisition request "req11" to the temporary storage server 300, by using the "URL1" corresponding to the image data "img1" selected in T74.

Second Modification

In the above-described embodiment, the communication system 2 includes the MFP 100. Alternatively, however, the communication system 2 may include a scanner in place of the MFP 100. In general, the management system may receive the original image data from an image processing device, such as the MFP 10 or scanner.

Third Modification

In the above-described embodiment, the intermediary server 200 generates the "URL1" in T40 of FIG. 2. Alternatively, however, the temporary storage server 300 may generate the "URL1" and transmit the generated "URL1" to the intermediary server 200. In general, the management system may generate the original image position information.

Fourth Modification

In the above embodiment, the communication system 2 includes the intermediary server 200 and temporary storage server 300. Alternatively, however, the communication system 2 may include only the intermediary server 200 functioning also as the temporary storage server 300.

In this case, T36 or T38 in FIG. 2 is not executed. Further, in T40, the intermediary server 200 generates the "URL1" indicating the storage position in the memory 224 in which the image data "img1" is to be stored. Further, in T44, the MFP 100 transmits the upload request "req6" to the intermediary server 200. Further, in T46, the intermediary server 200 stores the image data "img1" in the memory 224. T48 or T49 is not executed, and T50 is executed directly after T46.

In T76 of FIG. 3, the mobile 400 uses the "URL1" to transmit the image data acquisition request "req11" to the intermediary server 200. Further, in T78, the intermediary server 200 transmits the response "res11" including the image data "img1". The same is applied to the sequence diagrams of FIGS. 6 and 7. However, in the sequence diagram of FIG. 7, T100, T102, T108, or T110 is not executed. Further, in T104, the intermediary server 200 converts the image data "img2" into image data "img3". In general, the communication system may include the management system and image processing device.

Fifth Modification

The respective processing in the above-described embodiment are executed by the CPU 122 of the MFP 100, the CPU 222 of the intermediary server 200, and the CPU 322 of the temporary storage server 300 according to the software (program 126, program 226, and program 326) and thereby realized. Alternatively, however, the above-described respective processing may be realized by hardware such as a logic circuit.

What is claimed is:

1. A management system capable of communicating with both of an image processing device and a mobile device, the image processing device being configured to scan image from document, the management system comprising:
   a network interface; and
   a controller configured to perform:
      receiving a position information request through the network interface from the image processing device, the position information request being for requesting transmission of original image position information indicative of an original image storage position in an image data storage at which original image data is to be stored;

in response to receiving the position information request, transmitting the original image position information through the network interface to the image processing device such that the controller transmits first original image position information in response to receiving a first position information request and transmits second original image position information in response to receiving a second position information request, the first position information request and the second position information request being different from each other, a first original image storage position indicated by the first original image position information and a second original image storage position indicated by the second original image position information being different from each other;

receiving the original image data through the network interface from the image processing device that has accessed the management system by using the original image position information;

storing the original image data at the original image storage position in the image data storage;

determining whether to convert the received original image data;

generating code image data by encoding target image position information, the target image position information being indicative of a target image storage position in the image data storage at which target image data is stored based on the original image data, the code image data being different from the original image position information, the code image data being for acquiring the target image position information, the code image data expressing a code image to be displayed on the image processing device, first code image data being generated as the code image data when it is determined not to convert the original image data, second code image data, which is different from the first code image data, being generated as the code image data when it is determined to convert the original image data;

transmitting the code image data through the network interface to the image processing device;

receiving a target image data request through the network interface from the mobile device that has acquired the target image position information by reading the code image displayed on the image processing device, the target image data request designating the target image storage position indicated by the target image position information and requesting transmission of the target image data; and in response to receiving the target image data request, transmitting the target image data through the network interface to the mobile terminal.

2. The management system according to claim 1, wherein the controller is configured to further perform generating the original image position information in response to receiving the position information request.

3. The management system according to claim 1, wherein the management system includes a first management device and a second management device,
wherein the network interface includes a first network interface and a second network interface,
wherein the controller includes a first controller and a second controller,
wherein the first management device includes the first network interface and the first controller,
wherein the second management device includes the second network interface and the second controller,
wherein the first controller is configured to perform:
the receiving the position information request;
the transmitting the original image position information;
the determining whether to convert the original image data;
the generating the code image data; and
the transmitting the code image data, and
wherein the second controller is configured to perform:
the receiving the original image data;
the storing the original image data;
the receiving the target image data request; and
the transmitting the target image data.

4. The management system according to claim 3, wherein the first controller in the first management device transmits, through the first network interface to the image processing device, the original image position information that is indicative of the original image storage position in the image data storage of the second management device.

5. The management system according to claim 1, wherein when it is determined not to convert the original image data, the target image data is the same as the original image data, the target image storage position is the same as the original image storage position, and the first code image data is generated as the code image data by encoding the original image position information as the target image position information.

6. The management system according to claim 1, wherein the controller is configured to further perform converting the received original image data into the target image data when it is determined to convert the original image data, the target image storage position being a position at which the target image data obtained through conversion of the original image data is stored, the second code image data being generated as the code image data by encoding the target image storage position information.

7. The management system according to claim 6, further comprising a correspondence table storage that stores a correspondence table, in which machine information and format information are stored in association with each other, the machine information indicating a type of the image processing device, and the format information indicating a format of image data that the image processing device is capable of generating,
wherein the controller is configured to further perform:
receiving, through the network interface from the image processing device, the machine information of the image processing device and format information indicative of a format of the target image data; and
determining whether or not the format information that is stored in the correspondence table in association with the received machine information includes the received format information,
wherein when the format information that is stored in the correspondence table in association with the received machine information includes the received format information, it is determined not to convert the original image data, the original image data is not converted and the original image data is transmitted through the network interface to the mobile device as the target image data, and
wherein when the format information that is stored in the correspondence table in association with the received machine information does not include the received format information, it is determined to convert the original image data, the original image data is converted into the target image data, and the target image data is transmitted through the network interface to the mobile device.

8. The management system according to claim 1, wherein the controller is configured to further perform deleting the original image data from the original image storage position when a prescribed length of time or longer has elapsed after receipt of the original image data from the image processing device.

9. The management system according to claim 1, wherein the controller is configured to further perform deleting the original image data from the original image storage position when a deletion request is received through the network interface from the image processing device after receipt of the original image data from the image processing device, the deletion request being for requesting deletion of the original image data from the original image storage position, the deletion request being transmitted from the image processing device to the management system in response to a user's operation of the image processing device.

10. The management system according to claim 1,
wherein the controller is configured to receive, through the network interface, the position information request that the image processing device has transmitted by using a first network,
wherein the controller is configured to receive, through the network interface, the original image data that the image processing device has transmitted by using the first network, and
wherein the controller is configured to receive, through the network interface, the target image data request that the mobile device has transmitted by using a second network that is different from the first network.

11. The management system according to claim 1, wherein the code image data includes page data position information, the page data position information indicating a page data storage position in the image data storage at which page data is stored, the page data including the target image position information and expressing a page image for requesting a user to designate a target image corresponding to the target image data, and
wherein the controller is configured to receive the target image data request through the network interface from the mobile device that has read the code image displayed on the image processing device, has displayed the page image expressed by the page data, and has received the user's designation of the target image.

12. The management system according to claim 1, wherein the first position information request and the second position information request are different from each other in timings when the first position information request and the second position information request are received by the controller.

13. The management system according to claim 1, wherein the controller is configured to further perform:
receiving, from the image processing device, user setting information and device information, the user setting information being indicative of a user setting for scan operation that has been inputted to the image processing device in response to a user's operation of the image processing device, the device information being indicative of the image processing device; and
transmitting, to the image processing device, a scan instruction for instructing the image processing device to scan image from document, the scan instruction being determined based on the received user setting information and the received device information.

14. The management system according to claim 13, wherein the controller determines whether to convert the original image data based on the received user setting information and the received device information, and
wherein the scan instruction contains setting information indicative of a setting for scan operation with which the image processing device is instructed to perform scan operation,
wherein when it is determined not to convert the original image data, the setting information contained in the scan instruction is the same as the user setting information, and
wherein when it is determined to convert the original image data, the setting information contained in the scan instruction is different from the user setting information.

15. A communication system comprising:
an image processing device configured to scan image from document; and
a management system capable of communicating with the image processing device and a mobile device,
wherein the management system includes:
a network interface; and
a controller configured to perform:
receiving a position information request through the network interface from the image processing device, the position information request being for requesting transmission of original image position information indicative of an original image storage position in an image data storage at which original image data is to be stored;
in response to receiving the position information request, transmitting the original image position information through the network interface to the image processing device such that the controller transmits first original image position information in response to receiving a first position information request and transmits second original image position information in response to receiving a second position information request, the first position information request and the second position information request being different from each other, a first original image storage position indicated by the first original image position information and a second original image storage position indicated by the second original image position information being different from each other;
receiving the original image data through the network interface from the image processing device that has accessed the management system by using the original image position information;
storing the original image data at the original image storage position in the image data storage;
determining whether to convert the received original image data;
generating code image data by encoding target image position information, the target image position information being indicative of a target image storage position in the image data storage at which target image data is stored based on the original image data, the code image data being different from the original image position information, the code image data being for acquiring the target image position information, the code image data expressing a code image to be displayed on the image processing device, first code image data being generated as the code image data when it is determined not to convert the original image data, second code image data, which is different from the first code image data, being generated as the code image data when it is determined to convert the original image data;

transmitting the code image data through the network interface to the image processing device;

receiving a target image data request through the network interface from the mobile device that has acquired the target image position information by reading the code image displayed on the image processing device, the target image data request designating the target image storage position indicated by the target image position information and requesting transmission of the target image data; and in response to receiving the target image data request, transmitting the target image data through the network interface to the mobile device, wherein the image processing device includes:

another network interface;

a display; and another controller configured to perform:

transmitting the position information request through the another network interface to the management system in response to receiving an instruction inputted from an outside of the image processing device;

in response to the transmission of the position information request, receiving the original image position information through the another network interface from the management system;

transmitting the original image data through the another network interface to the management system by accessing the management system by using the original image position information;

in response to the transmission of the original image data, receiving the code image data through the another network interface; and controlling the display to display the code image expressed by the code image data.

16. The communication system according to claim 15, wherein the controller is configured to further perform generating the original image position information in response to receiving the position information request.

17. The communication system according to claim 15, wherein the first position information request and the second position information request are different from each other in timings when the first position information request and the second position information request are received by the controller.

18. The communication system according to claim 15, wherein when it is determined not to convert the original image data, the target image data is the same as the original image data, the target image storage position is the same as the original image storage position, and the first code image data is generated as the code image data by encoding the original image position information as the target image position information, and wherein the controller is configured to further perform converting the received original image data into the target image data when it is determined to convert the original image data, the target image storage position being a position at which the target image data obtained through conversion of the original image data is stored, the second code image data being generated as the code image data by encoding the target image storage position information.

19. The communication system according to claim 15, wherein the controller is configured to further perform:

receiving, through the network interface from the image processing device, user setting information and device information, the user setting information being indicative of a user setting for scan operation, the device information being indicative of the image processing device; and transmitting, through the network interface to the image processing device, a scan instruction for instructing the image processing device to scan image from document, the scan instruction being determined based on the received user setting information and the received device information, the another controller is configured to further perform:

receiving the user setting information in response to a user's operation of the image processing device;

in response to the receipt of the user setting information, transmitting the user setting information and the device information through the another network interface to the management server;

in response to the transmission of the user setting information and the device information, receiving the scan instruction through the another network interface from the management server; and performing the scan operation according to setting information contained in the scan instruction, the setting information being indicative of a setting for scan operation with which the image processing device is instructed to perform scan operation.

20. The communication system according to claim 19, wherein the controller determines whether to convert the original image data based on the received user setting information and the received device information, and wherein when it is determined not to convert the original image data, the setting information contained in the scan instruction is the same as the user setting information, and wherein when it is determined to convert the original image data, the setting information contained in the scan instruction is different from the user setting information.

21. A non-transitory computer readable storage medium storing a set of program instructions for a management system, the management system being capable of communicating with both of an image processing device and a mobile device, the image processing device being configured to scan image from document, the management system including a network interface and a controller, the program instructions, when executed by the management system, causing the management system to perform:

receiving a position information request through the network interface from the image processing device, the position information request being for requesting transmission of original image position information indicative of an original image storage position in an image data storage at which original image data is to be stored;

in response to receiving the position information request, transmitting the original image position information through the network interface to the image processing device such that first original image position information is transmitted in response to receiving a first position information request and second original image position information is transmitted in response to receiving a second position information request, the first position information request and the second position information request being different from each other, a first original image storage position indicated by the first original image position information and a second original image storage position indicated by the second original image position information being different from each other;

receiving the original image data through the network interface from the image processing device that has accessed the management system by using the original image position information;

storing the original image data at the original image storage position in the image data storage;

determining whether to convert the received original image data;

generating code image data by encoding target image position information, the target image position information being indicative of a target image storage position in the image data storage at which target image data is stored based on the original image data, the code image data being different from the original image position information, the code image data being for acquiring the target image position information, the code image data expressing a code image to be displayed on the image processing device, first code image data being generated as the code image data when it is determined not to convert the original image data, second code image data, which is different from the first code image data, being generated as the code image data when it is determined to convert the original image data;

transmitting the code image data through the network interface to the image processing device;

receiving a target image data request through the network interface from the mobile device that has acquired the target image position information by reading the code image displayed on the image processing device, the target image data request requesting transmission of the target image data by using the target image position information; and in response to receiving the target image data request, transmitting the target image data through the network interface to the mobile device.

22. The non-transitory computer readable storage medium according to claim 21, wherein the program instructions, when executed by the management system, cause the management system to further perform generating the original image position information in response to receiving the position information request.

23. The non-transitory computer readable storage medium according to claim 21, wherein the first position information request and the second position information request are different from each other in timings when the first position information request and the second position information request are received by the management system.

* * * * *